(12) United States Patent
Johnson

(10) Patent No.: US 6,202,682 B1
(45) Date of Patent: Mar. 20, 2001

(54) PRESSURE REGULATOR WITH SELECTOR CONTROL

(76) Inventor: Dwight N. Johnson, 6327 Chorlito Dr., Carlsbad, CA (US) 92008

(*) Notice: Subject to any disclaimer, the term of this patent is extended or adjusted under 35 U.S.C. 154(b) by 0 days.

(21) Appl. No.: 09/225,104

(22) Filed: Jan. 4, 1999

(51) Int. Cl.[7] .......................... G05D 16/00; F16K 31/145
(52) U.S. Cl. ................... 137/495; 137/505; 137/505.44; 251/85
(58) Field of Search .................................... 137/505, 495, 137/505.44, 505.46, 505.38, 505.41, 510, 906; 251/85

(56) References Cited

U.S. PATENT DOCUMENTS

| | | | |
|---|---|---|---|
| 1,773,604 | * 8/1930 | Scovel et al. | 137/505.45 |
| 2,198,070 | * 4/1940 | Wile . | |
| 2,261,364 | * 11/1941 | Grove | 137/906 X |
| 3,117,591 | * 1/1964 | Schutmaat | 251/85 |
| 4,481,971 | 11/1984 | Farrell et al. . | |
| 5,275,203 | * 1/1994 | Robinson | 137/510 |
| 5,771,921 | 6/1998 | Johnson | 137/505 |

* cited by examiner

Primary Examiner—Stephen M. Hepperle
(74) Attorney, Agent, or Firm—Mason, Kolehmainen, Rathburn & Wyss; Philip M. Kolehmainen

(57) ABSTRACT

A pressure regulator for supplying water to a poultry watering system or the like includes a control assembly for operating the pressure regulator in a normal or "on" mode, an off mode or a flush or bypass mode. A desired operating pressure is set by loading a diaphragm responsive to output pressure changes. Diaphragm movement is transferred by the control system to a valve member cooperating with an inlet orifice. The control system includes a spring captured in a preloaded state between first and second end members, one connected to the valve member and the other connected to the diaphragm. A knob is rotated from a normal "on" position to an off position and a collar pushes the end members together and pushes the valve member against the orifice. The knob is rotated to a flush or bypass position and the collar pulls the end members together and pulls the valve member away from the orifice. The inlet orifice and an inlet port are parts of a removeably mounted inlet member.

11 Claims, 5 Drawing Sheets

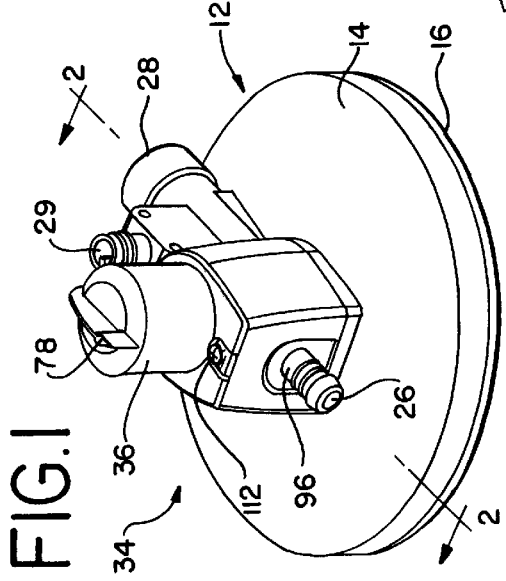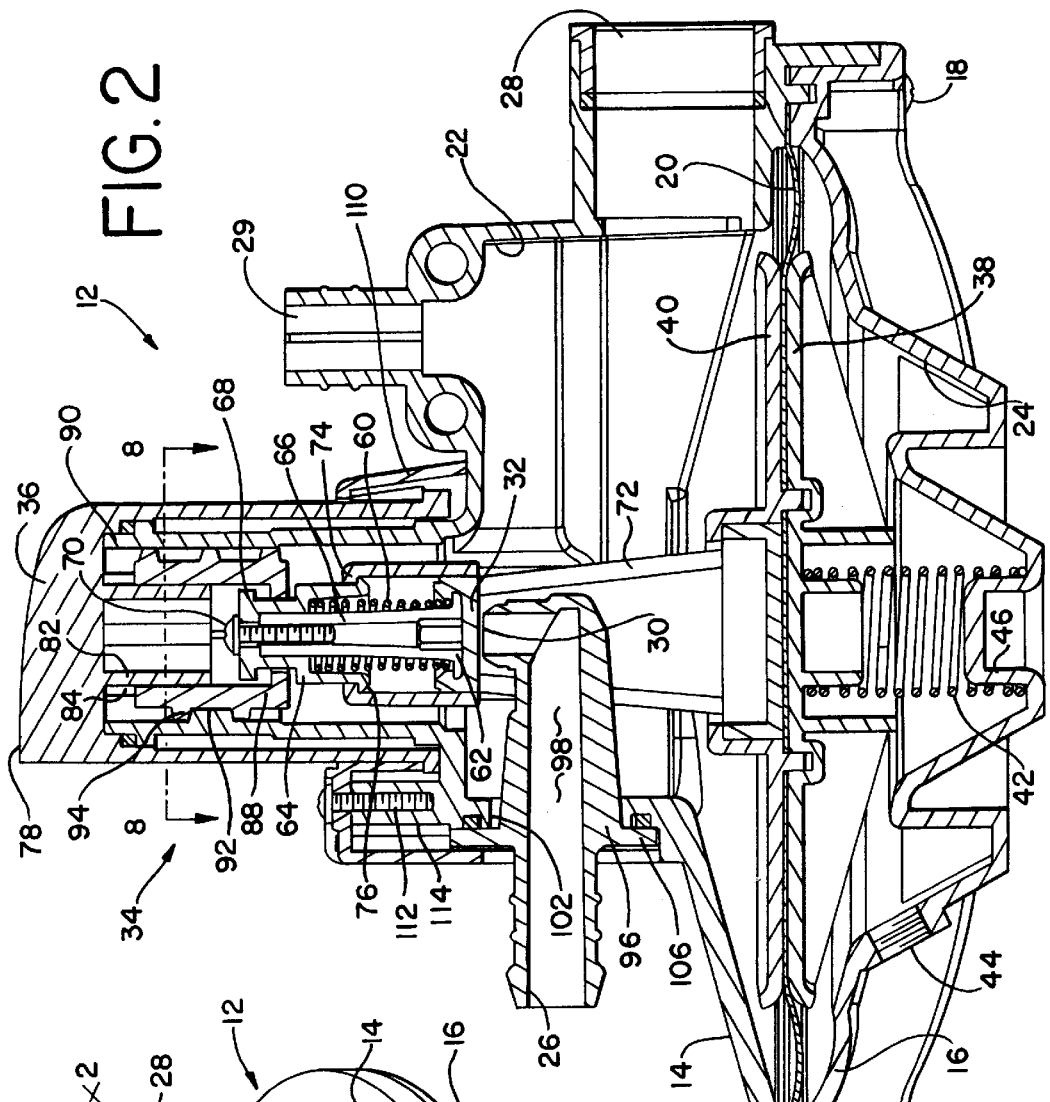

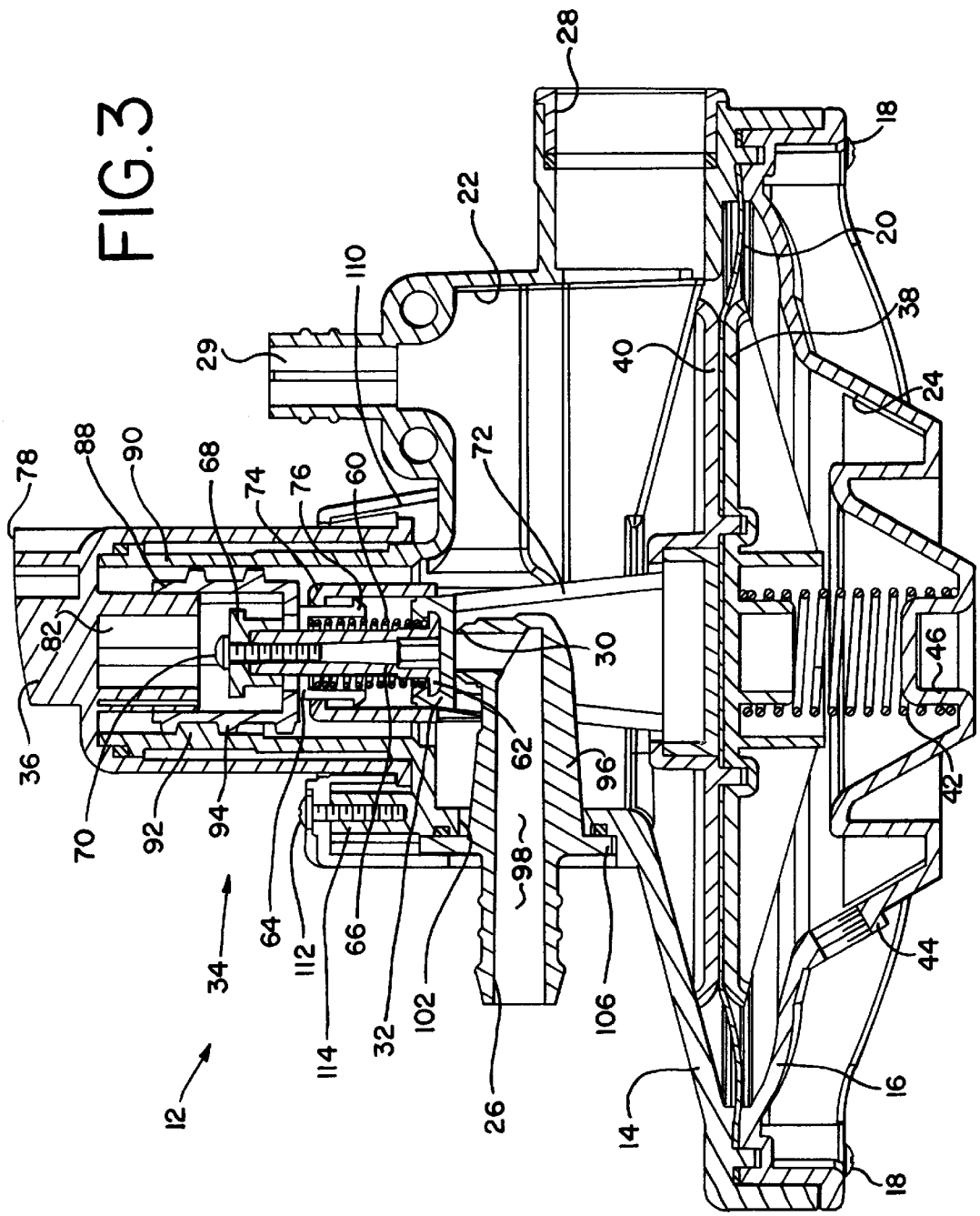

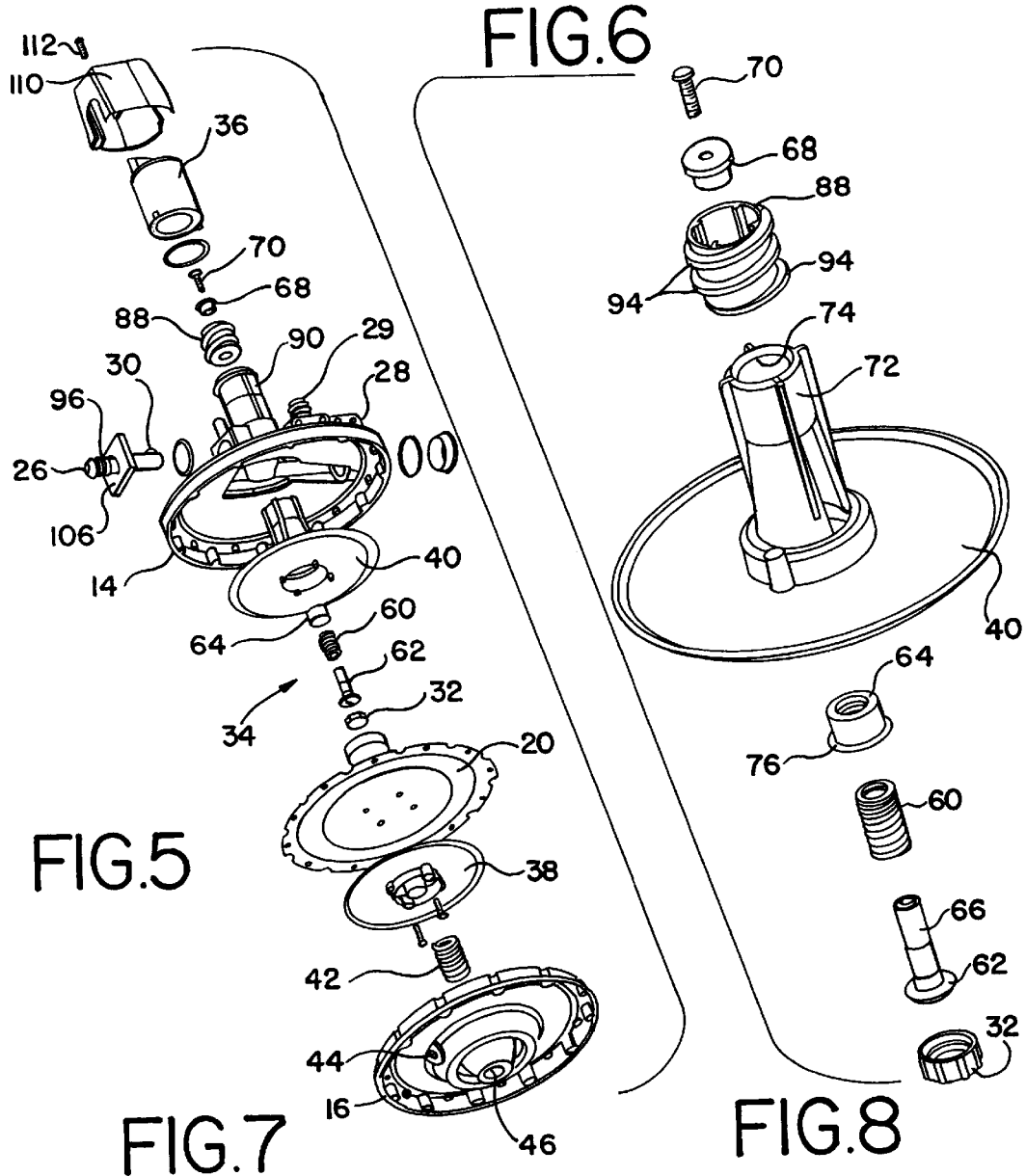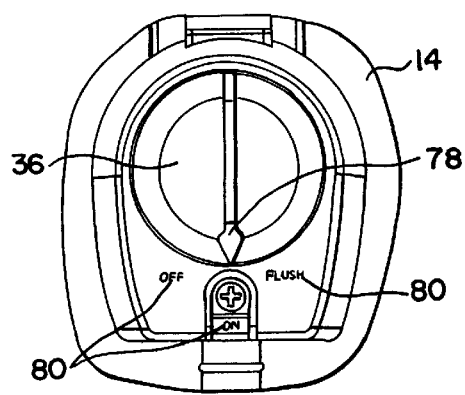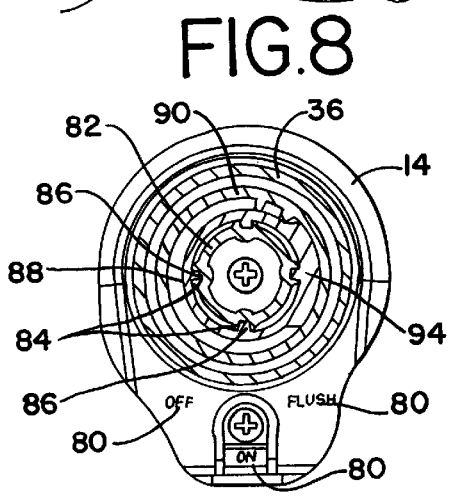

PRESSURE REGULATOR WITH SELECTOR CONTROL

FIELD OF THE INVENTION

The present invention relates to pressure regulators for water drinking systems and the like, and more particularly to an improved pressure regulator having a selector control for operating the regulator in different modes of operation.

DESCRIPTION OF THE PRIOR ART

A pressure regulator may be used for regulating the supply of drinking water to cup or nipple drinkers of a poultry watering system. A pressure regulator for this application is required to reduce inlet water pressures in the range of three to sixty pounds per square inch (psi) to a low water column (wc) pressure of four to twenty-one inches of water. A typical regulator includes a flexible diaphragm exposed to output pressure in a pressure chamber into which water is admitted by a valve member cooperating with an inlet orifice. Output pressure changes cause diaphragm movement which is transferred to movement of the valve member for maintaining a selected output pressure.

A pressure regulator for poultry watering systems is preferably able to operate in different modes of operation. In the normal or "on" mode, the regulator reduces inlet pressure to maintain a selected low water column pressure for supplying drinker cups or nipples in the system. In an off mode, flow of water through the regulator is prevented in order to terminate operation of the system. In a flush or bypass mode, water flows through the regulator continuously at an increased pressure to flush out contaminated or stale water or water containing residual medications or nutrients. Known regulators have not provided simple and reliable controls for selecting normal, off and flush modes of operation. It has been a long standing problem to provide a simple, reliable pressure regulator with a single control system for selecting and controlling normal, off and flush operating modes with few parts and minimum complexity U.S. Pat. No. 5,771,921 discloses a pressure regulator for poultry watering systems. The regulator disclosed in that patent includes an adjustment knob that can be moved within a range of normal or on positions to set a desired outlet pressure by varying the compression of a reference spring and, as a result, the force applied to the diaphragm of the regulator. In addition the adjustment knob can be rotated to an off position to take the regulator off line. The off position in this regulator removes loading force from the diaphragm of the regulator so that a separate return spring prevents flow through the regulator. To achieve a flush mode of operation, a separate override control is operated to relieve pressure in an outlet chamber to cause increased flow through the regulator.

SUMMARY OF THE INVENTION

A principal object of the present invention is to provide an improved pressure regulator including a simple and reliable control system for selecting different modes of operation; to provide a pressure regulator in which movement of a single knob to different positions selects a normal, off or flush mode of operation; to provide a pressure regulator including a novel control system for operating in normal, off and flush modes, and for preventing valve damage in the event of abnormally high system back pressure; to provide a pressure regulator in which an inlet section is easily removable, thus providing the capability of quickly changing the flow characteristics of the regulator; to provide a pressure regulator in which various modes of operation are selected and controlled by an easily manufactured and assembled control assembly having few parts; and to provide a pressure regulator overcoming problems and providing an improvement over pressure regulators used in the past.

In brief, in accordance with the invention there is provided a pressure regulator having an inlet orifice exposed to a range of inlet pressures and a valve member movable relative to the orifice to control flow through the orifice. A pressure responsive member moves in response to reduced pressure downstream from the orifice and a control system translates movement of the pressure responsive member to the valve member and selects operating modes of the pressure regulator. The control system includes first and second interfacing end members and a spring captured in compression between the end members. The valve member is connected to the first end member and the pressure responsive member is connected to the second end member. A retainer is connected to the first end member and the assembly is slidable relative to the second end member, with the retainer extending from the first end member beyond the second end member. The retainer includes a reaction portion normally abutting the second end member to limit the distance between the first and second end members and preload the spring in compression providing a preload force greater than the force required to close the valve member against the orifice throughout a range of inlet pressures. An operating mode selector is movable to normal, off and flush positions. The selector in the off position contacts the second end member and pushes it to overtravel toward the first end member in order to compress the spring beyond the preload and hold the valve member forcibly against the orifice. The selector in the flush position contacts the reaction portion of the retainer and pulls the first end member toward the second end member to overtravel toward the second end member in order to compress the spring beyond the preload and hold the valve member away from the orifice. The selector in the normal position is spaced from the reaction portion of the retainer and from the second end member, permitting the end members and preloaded spring assembly to move the valve member in response to movement of the pressure responsive member.

BRIEF DESCRIPTION OF THE DRAWING

The present invention together with the above and other objects and advantages may best be understood from the following detailed description of the preferred embodiments of the invention illustrated in the drawings, wherein:

FIG. 1 is an isometric view of a pressure regulator constructed in accordance with the present invention;

FIG. 2 is an enlarged cross sectional view of the pressure regulator of FIG. 1 taken along the line 2—2 of FIG. 1 and illustrating the pressure regulator in the normal or "on" operating mode;

FIG. 3 is a view like FIG. 2 illustrating the pressure regulator in an off mode;

FIG. 5 is an exploded isometric view of components of the regulator of FIGS. 1–4;

FIG. 6 is an exploded isometric view of components of the control system of the pressure regulator of FIGS. 1–4

FIG. 7 is a fragmentary top view of the pressure regulator;

FIG. 8 is cross sectional view taken along the line 8—8 of FIG. 2;

DETAILED DESCRIPTION OF THE PREFERRED EMBODIMENTS

Figure 4:
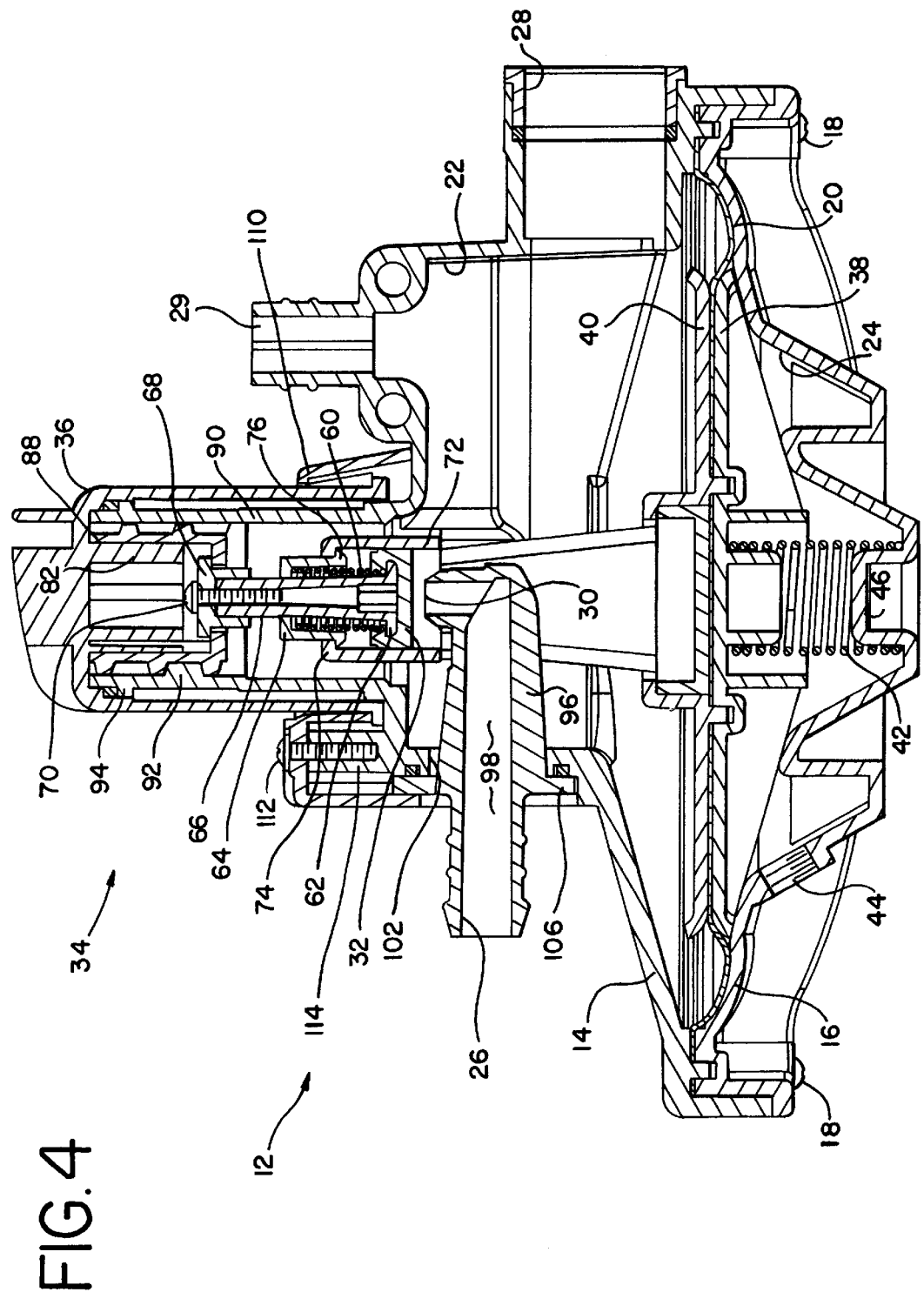
FIG. 4 is a view like FIG. 2 illustrating the pressure regulator in a flush operating mode.

Having reference now to the drawings and initially to FIGS. 1–10, there is illustrated a pressure regulator generally designated as 12 and constructed in accordance with the principles of the present invention. The pressure regulator 12 may be used to supply water to a poultry watering system, and includes upper and lower body portions 14 and 16 joined by fasteners 18. The periphery of a flexible diaphragm 20 is captured between the upper and lower body portions 14 and 16 and divides the interior of the pressure regulator 12 into an upper, outlet chamber 22 and a lower, loading chamber 24.

Water under pressure, for example in the range of from 3 to 60 psi, is supplied through an inlet port 26, and reduced output pressure water, for example in the range of 4 to 21 inches wc, is delivered through an outlet port 28. A pressure sensing port 29 may be used for sensing outlet pressure. A pressure reducing valve assembly including an inlet orifice 30 and a movable valve member 32 controls flow from the inlet port 26 into the outlet chamber 22. The diaphragm 20 is exposed to output pressure in the outlet chamber 22. A control assembly 34 is operated by a knob 36 to selectively operate the pressure regulator in a normal "on" mode, or in an off mode to prevent flow from the outlet port 28, or in a flush or bypass mode in which water at an increased output pressure is supplied to cleanse the system supplied by the pressure regulator 12.

In the normal or "on" mode (FIG. 2), the control assembly 34 transmits pressure responsive movement of the diaphragm 20 to the valve member 32 in order to maintain a desired set output pressure. In the off mode (FIG. 3) the control assembly 34 holds the valve member 32 against the inlet orifice 30 to prevent flow through the pressure regulator 12. In the flush mode (FIG. 4) the control assembly 34 holds the valve member 32 away from the inlet orifice despite increased output pressure to permit a bypass or flush flow through the pressure regulator 12.

The central portion of the diaphragm 20 is captured between lower and upper support disks 38 and 40. The upper and lower body portions 14 and 16 are shaped to limit diaphragm movement and to support the portion of the diaphragm radially outside of the disks 38 and 40 to prevent damage to the diaphragm resulting from large pressure differentials across the diaphragm (FIG. 4)

The pressure regulator 12 is set to provide a desired output pressure by varying a loading force developed in the loading chamber 24 and applied to the underside of the diaphragm 20. In the embodiment of FIGS. 1–10, the loading force is supplied by a non adjustable reference spring 42 supplemented by fluid or air pressure introduced into the loading chamber 24 through a reference pressure port 44. The spring 42 is captured in compression between a boss 46 of the lower body portion 16 and the lower diaphragm support disk 38. The spring 42 is selected to apply sufficient force to cause the pressure regulator 12 to supply output pressure at a minimum value of, for example, 4 inches wc, even if no air pressure is present. Reference air pressure introduced through the port 44 adjusts the operating set point to values higher than the minimum value by increasing the upward force applied to the diaphragm 20. Reference may be had to co-pending U.S. patent application Ser. No. 09/130,217, filed on Aug. 6, 1998, now U.S. Pat. No. 5,967,167, incorporated herein by reference, for a further description of a remote controlled drinker system in which air pressure is supplied to a pressure regulator to set the output pressure operating point.

Figure 10:
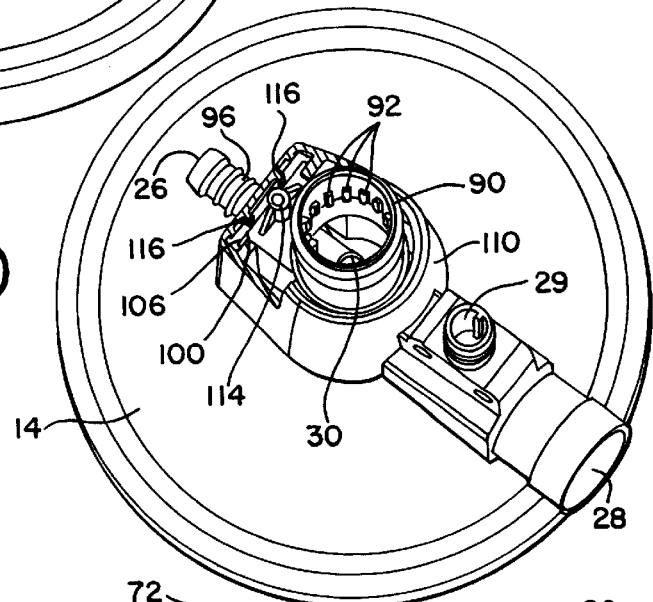
FIG. 10 is a partly sectioned top isometric view of the assembled inlet section and upper body.
Figure 11:
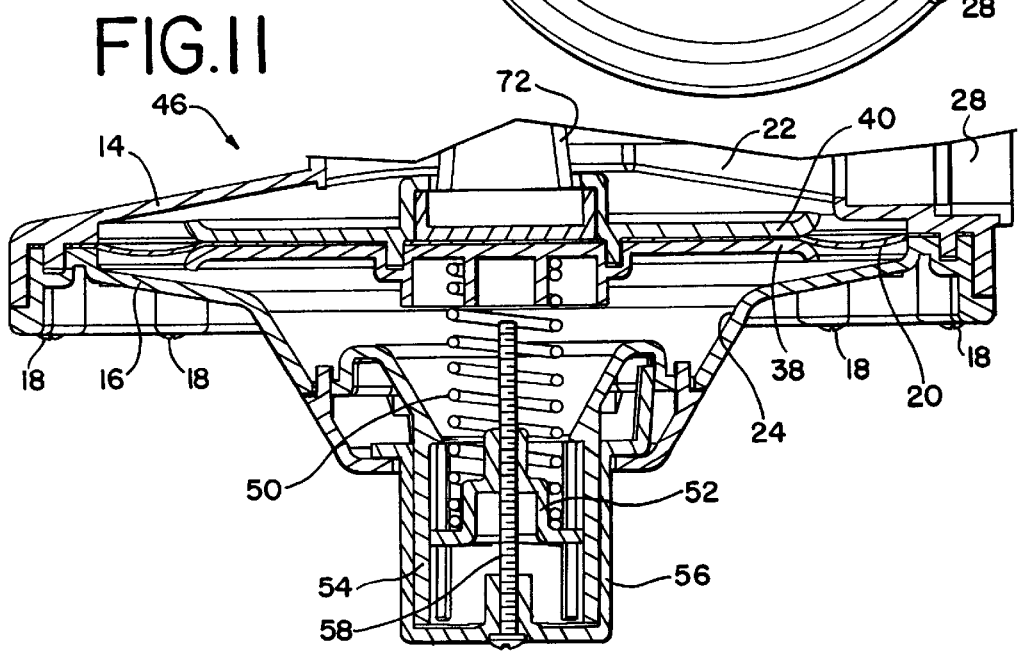
FIG. 11 is a fragmentary cross sectional view similar to a portion of FIG. 2 illustrating an alternative embodiment of the invention.

FIG. 11 illustrates an alternate embodiment of the invention wherein a variable spring force rather than fluid pressure variation is used to set the output pressure of the pressure regulator, there designated generally as 46. The regulator 46, otherwise similar to the regulator 12 of FIGS. 1–10, includes a loading spring 50 captured in compression between the lower diaphragm support disk 38 and an axially movable spring support 52 held against rotation by a spline connection to a support collar 54. A non rising adjustment knob 56 is rotated to rotate a screw 58 threaded into the spring support 52. Rotation of the knob 56 and screw 58 results in axial movement of the spring support 52, varying the compression of the loading spring 50, the loading force applied by the spring 50 to the diaphragm 20, and the output pressure set point of the pressure regulator 48.

The control assembly 34 includes a spring 60 captured between first (lower) and second (upper) end members 62 and 64. The lower end member 62 includes a retainer in the form of an axial, upwardly extending shank 66 slideably extending through a central opening in the upper end member 64. The shank terminates in an enlarged head or reaction member 68 held in place by a fastener 70. The lower end of the head 68 normally contacts the upper end member 64 and limits the distance between the end members 62 and 64. In this normal condition, the spring 60 is preloaded and compressed between the end members 62 and 64.

The upper diaphragm support disk 40 includes an upstanding, axially extending cage portion 72 that moves up and down together with the diaphragm 20 in response to changes in the output pressure within the outlet chamber 22. A rim 74 at the top of the cage portion 72 overlies and normally engages a flange 76 extending outward from the upper end member 64. The upper disk 40 therefore serves as a movable pressure responsive member normally connected to the upper end member 64. The valve member 32 is a flexible and resilient cup of rubber or the like that is retained on the bottom of the lower end member, aligned with the inlet orifice 30.

When the valve member 32 engages the inlet orifice to choke off flow of water into the outlet chamber, the valve member 32 is subjected to a force resulting from the inlet pressure. The preload force of the spring 60 may be, for example, six pounds, and is substantially more than the force resulting from inlet pressure. Thus, in normal or "on" operation of the pressure regulator 12 as seen in FIG. 2, the end members 62 and 64 and the preloaded spring 60 move as a unit, transferring movement of the diaphragm 20 to the valve member 32. Output pressure increases result in downward motion of the valve member 32, reducing flow through the orifice 30. Conversely, output pressure decreases result in upward motion of the valve member 32, increasing flow through the orifice 30. A constant output pressure is maintained in the outlet chamber 22 equal to the desired pressure set by the loading force applied to the diaphragm in the loading chamber 24.

In the event of high downstream pressures, the pressure in the outlet chamber 22 rises, forcing the diaphragm 20 downwardly. As a result the control assembly 34 forces the valve member 32 against the orifice 30. The preloaded spring 60 compresses as a result of large valve closing forces, for example in excess of six pounds, to prevent the application of possibly damaging forces to the valve member 32. Also, in this high back pressure condition, downward movement of the lower disk 38 is limited by contact with the lower body portion 16, and the lower body portion 16 is shaped to support the diaphragm in a manner similar to that illustrated in FIG. 4

Control assembly 34 is operated by the knob 36 to place the pressure regulator 12 in an off mode of operation in which no water flows from the outlet port 28. The off mode can be used for example to terminate operation of a poultry watering system supplied by the pressure regulator 12. The knob 36 includes a pointer 78 (FIG. 7) cooperating with indicia 80 indicating the operating mode of the pressure regulator 12. The knob 36 is rotated nearly one hundred eighty degrees in the clockwise direction from the on position of FIG. 7 to the off position to place the pressure regulator 12 in the off mode illustrated in FIG. 3.

Knob 36 includes an internal shank 82 having axially extending grooves 84 receiving splines 86 within a collar 88. The collar 88 is received in a neck portion 90 of the upper body portion 14. A single segmented thread 92 is formed in the neck portion 90 and extends slightly less than three hundred sixty degrees around the neck portion 90. The collar 88 is provided with mating threads 94. As a result, when the knob 36 is rotated from the on to the off position, the collar 88 is rotated by engagement of the splines 86 and the grooves 84, and the engagement of threads 94 and 92 causes the collar 88 to move downward from the position of FIG. 2 to the position of FIG. 3. The lower end of the collar 88 engages the upper end member 64 and forces it down. The valve member 32 is forced against the inlet orifice 30, preventing all flow of water into the outlet chamber 22. The spring 60 is compressed, proving for overtravel of the upper end member 64 while preventing the application of possibly damaging large forces to the valve member 32.

Referring again to FIG. 2, it can be seen that in the normal or "on" operating mode of the pressure regulator 12, the collar 88 does not interfere with normal operation of the control system 34. Throughout the normal range of movement of the components, the lower end of the collar 88 is below a flange at the upper end of the reaction member 68 and is above the upper end member 64.

Control assembly 34 is also operated by the knob 36 to place the pressure regulator 12 in a flush or bypass mode of operation in which water flows from the outlet port 28 at an increased outlet pressure. The flush mode is useful in cleansing a poultry drinking system supplied by the pressure regulator 12 by flushing contaminants and residual materials from the system. The knob 36 with pointer 78 (FIG. 7) is rotated in the counter clockwise direction nearly one hundred eighty degrees from the on position of FIG. 7 to the flush position to place the pressure regulator 12 in the flush mode illustrated in FIG. 4.

When the knob 36 is rotated, the collar 88 is rotated by engagement of the grooves 84 and the splines 86, and the engagement of threads 94 and 92 causes the collar 88 to move upward from the position of FIG. 2 to the position of FIG. 4. The flange at the upper end of the reaction member 68 is captured in the lower end of the collar 88, and the collar 88 pulls the reaction member 68 and the lower end member 62 upward to lift the valve member 32 well away from the inlet orifice 30, permitting a large volume flow of flush water through the outlet chamber 22. The relatively high output pressure in the chamber 22 moves the diaphragm 20 downward, with downward movement limited by engagement of the lower support disk 38 against the lower body 16 and with the lower body 16 supporting the diaphragm 20. The spring 60 is compressed, providing for overtravel of the upper end member 64 relative to the lower end member 62

The end members 62 and 64 together with the preloaded spring 60 function as what can be termed an overtravel cartridge. In normal "on" operation the spring preload exceeds forces to which the cartridge is subjected and the parts move as a unit. In the off and flush operating modes, and also in the event of high back pressures during normal operation, the spring 60 permits the end members 62 and 64 to overtravel. This overtravel cartridge effect permits the simple arrangement of parts to achieve different operating modes, while also preventing possible damage to the valve member 32 or orifice 30 due to overloading.

Figure 9:
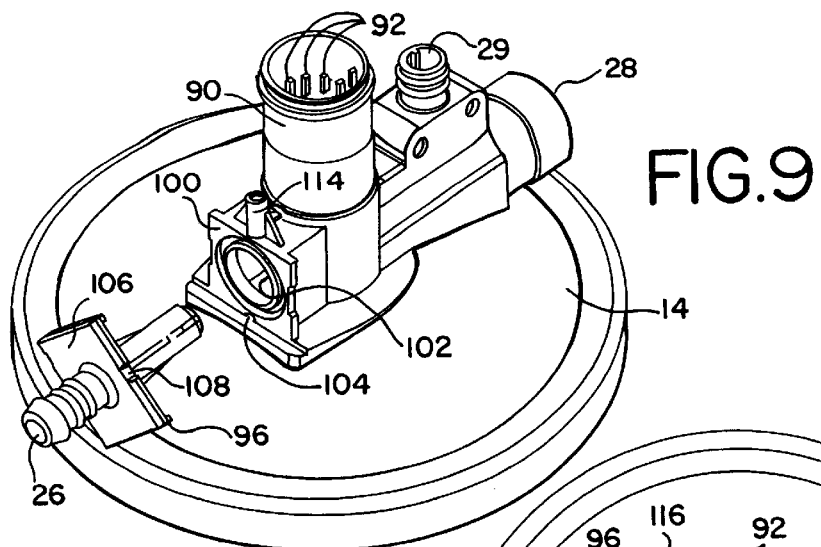
FIG. 9 is an exploded isometric view of the upper body and inlet member of the pressure regulator prior to assembly.

As seen in FIGS. 9 and 10, the inlet port 26 and the inlet orifice 30 are parts of an inlet member 98 that is removeably mounted on the upper body portion 14. An inlet passage 96 extends from the port 26 to the orifice 30. An advantage of this arrangement is that the inlet member 96 may be replaced in order to tailor the pressure regulator 12 to a specific poultry watering system. For example a larger orifice 30 may be used for relatively low inlet pressures and a smaller orifice 30 may be used for higher inlet pressures without removing or disassembling or replacing the entire pressure regulator 12. In addition the inlet member 96 can be removed to permit access to the valve member 32 for replacement.

The inlet member 98 is accurately located when mounted upon the upper body portion 14 so that the orifice is correctly positoned and oriented relative to the valve member 32. The body portion 14 includes a flat, planar mounting pad 100 surrounding a mounting opening 102. A positioning tab 104 is located at the bottom of the pad surface 100. The inlet member 96 includes a plate portion 106 with a positioning notch 108. As indicated in FIG. 9, the inlet member slides into the opening 102 with the orifice 30 entering the outlet chamber 22. The inlet member 96 is rotated from the orientation seen in FIG. 9 until the plate 106 interfaces with the pad 100 and the tab 104 mates with the notch 108 to assure that the orifice 30 is directed upwardly toward the valve member 32.

A cap 110 retains the inlet member in place. The cap 110 is installed over the neck portion 90 of the upper body portion 14 and is held in place by a fastener 112 received in a boss 114 on the upper housing portion 14. The cap 110 includes internal protrusions 116 that engage the top of the plate 106 to press the inlet member 96 downward and define the vertical position of the orifice 30. Flanges 118 within the cap 110 engage the rear of ribs along the sides of the of the plate portion 106 to sandwich the plate portion in place. The cap 110 also holds the knob 36 in place.

While the present invention has been described with reference to the details of the embodiments of the invention shown in the drawing, these details are not intended to limit the scope of the invention as claimed in the appended claims.

What is claimed is:

1. A pressure regulator for providing a reduced output pressure from an elevated fluid supply pressure, said pressure regulator comprising:

a body having an inlet adapted to be connected to the fluid supply pressure, an outlet chamber and an outlet communicating with said outlet chamber;

a valve orifice separating said inlet and outlet chamber;

a valve member in said outlet chamber movable relative to said valve orifice for controlling flow through said valve orifice from said inlet to said outlet; and a pressure responsive member in said outlet chamber movable in response to output pressure variations;

said pressure regulator being characterized by:

an overtravel cartridge connected between said pressure responsive member and said valve member for moving said valve member toward said valve orifice in response to an increase in output pressure;

said overtravel cartridge including first and second relatively movable, spaced apart end members and a spring captured between said end members;

said valve member being connected to said first end member and said pressure responsive member being coupled to said second end member;

said end members being interlocked to compress said spring with a preload force greater than required to hold said valve member against said valve orifice in opposition to fluid supply pressure; and a selector assembly movable between a normal position and a flush position, said selector assembly including an actuator spaced from said end members in said normal position and said actuator engaging said first end member and further compressing said spring to move said valve member away from said valve orifice in said flush position.

2. The pressure regulator of claim 1, said selector assembly being movable to an off position and said actuator engaging said second end member and further compressing said spring to move said valve member firmly against said valve orifice in said off position.

3. The pressure regulator of claim 1, said spring further compressing to permit said second end member to overtravel toward said first end member in response to high output pressure.

4. The pressure regulator of claim 1, said pressure responsive member comprising a flexible diaphragm.

5. The pressure regulator of claim 1, said selector assembly including a rotatable knob coupled to said actuator, said body and said actuator including mating threads.

6. The pressure regulator of claim 1, said body including a removable inlet section defining said inlet and said valve orifice.

7. A method for controlling a pressure regulator having a valving orifice, a valve member movable relative to the orifice and a movable member responsive to output pressure, said method comprising the steps of:

transmitting movement of the pressure responsive member to the valve member during normal operation through an overtravel cartridge having a first end member connected to the valve member, a second end member connected to the movable member and a spring compressed in preload between the first and second end members;

selecting a flush condition by forcing the valve member away from the orifice with sufficient force to further compress the spring; and selecting an off condition by forcing the overtravel cartridge toward the orifice with sufficient force to further compress the spring.

8. A method as claimed in claim 7 wherein said step of selecting a flush condition includes pulling the first end member away from the orifice.

9. A method as claimed in claim 7 wherein said step of selecting an off condition includes pushing the second end member toward the orifice.

10. A pressure regulator comprising:

an inlet orifice exposed to a range of inlet pressures;

a valve member movable relative to said orifice to control flow through said orifice;

a pressure responsive member movable in response to reduced pressure downstream form said orifice; and a control system for translating movement of said pressure responsive member to said valve member and for selecting operating modes of the pressure regulator;

said control system including first and second interfacing end members;

a spring captured in compression between said end members;

said valve member being connected to said first end member and said pressure responsive member being connected to said second end member;

a retainer connected to said first end member and slidable relative to said second end member, said retainer extending from said first end member beyond said second end member;

said retainer including a reaction portion normally abutting said second end member to limit the distance between said first and second end members and preload said spring with a compression providing a preload force greater than the force required to close said valve member against said orifice throughout a range of inlet pressures;

an operating mode selector movable to normal, off and flush positions;

said selector in said off position contacting said second end member and pushing it to overtravel toward said first end member in order to compress said spring beyond said preload and hold said valve member forcibly against said orifice;

said selector in said flush position contacting said reaction portion of said retainer and pulling said first end member toward said second end member to overtravel toward said second end member in order to compress said spring beyond said preload and hold said valve member away from said orifice;

said selector in said normal position being spaced from said reaction portion of said retainer and from said second end member permitting said end members and preloaded spring to move said valve member in response to movement of said pressure responsive member.

11. The pressure regulator of claim 10, said selector comprising a collar mounted for axial motion relative to said second end cap and said retainer, and a knob rotatable to normal, off and flush positions, and a thread system for translating rotation of said knob to axial motion of said collar.

* * * * *